US010701292B2

(12) United States Patent
Furuta

(10) Patent No.: US 10,701,292 B2
(45) Date of Patent: Jun. 30, 2020

(54) DEVICE AND METHOD FOR CONTROLLING SOLID-STATE ELECTRONIC IMAGING DEVICE

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 16/104,400

(22) Filed: Aug. 17, 2018

(65) Prior Publication Data
US 2018/0359436 A1 Dec. 13, 2018

Related U.S. Application Data

(63) Continuation of application No. PCT/JP2016/086687, filed on Dec. 9, 2016.

(30) Foreign Application Priority Data

Mar. 24, 2016 (JP) ................................ 2016-059536

(51) Int. Cl.
H04N 5/353 (2011.01)
H04N 5/374 (2011.01)
(Continued)

(52) U.S. Cl.
CPC ............ H04N 5/3535 (2013.01); H04N 5/04 (2013.01); H04N 5/378 (2013.01); H04N 5/3742 (2013.01)

(58) Field of Classification Search
CPC .... H04N 5/3535; H04N 5/3742; H04N 5/378; H04N 5/04
See application file for complete search history.

(56) References Cited

U.S. PATENT DOCUMENTS

2008/0252765 A1 10/2008 Ito
2012/0145881 A1* 6/2012 Sonoda ................ H04N 5/3532
250/208.1
(Continued)

FOREIGN PATENT DOCUMENTS

JP 2004-140479 A 5/2004
JP 2006-14117 A 1/2006
(Continued)

OTHER PUBLICATIONS

Japanese Office Action, dated Jul. 16, 2019, for corresponding Japanese Application No. 2018-506768, along with an English translation.

(Continued)

Primary Examiner — Ahmed A Berhan
(74) Attorney, Agent, or Firm — Birch, Stewart, Kolasch & Birch, LLP

(57) ABSTRACT

Provided are a device and method for controlling a solid-state electronic imaging device which can change the amount of exposure of a photoelectric conversion element without changing the structure of the imaging device. A reset pulse and a read pulse are applied to photoelectric conversion elements included in an imaging device in synchronization with a synchronizing signal. The output interval of the synchronizing signal up to the photoelectric conversion elements in a predetermined row is ΔH1 and is constant. For the photoelectric conversion elements in the subsequent rows, the output interval of the synchronizing signal is ΔH2 that is longer than ΔH1. Since the reset pulse and the read pulse are synchronized with the synchronizing signal, the output interval of the synchronizing signal is long. It is possible to adjust the amount of exposure of the photoelectric conversion element.

7 Claims, 9 Drawing Sheets

(51) Int. Cl.
*H04N 5/04* (2006.01)
*H04N 5/378* (2011.01)

(56) References Cited

U.S. PATENT DOCUMENTS

| | | |
|---|---|---|
| 2012/0314124 A1 | 12/2012 | Kaizu et al. |
| 2014/0204253 A1 | 7/2014 | Mihara et al. |
| 2016/0173751 A1 | 6/2016 | Nakata |

FOREIGN PATENT DOCUMENTS

| | | | |
|---|---|---|---|
| JP | 2008-263262 A | | 10/2008 |
| JP | 2010-88019 A | | 4/2010 |
| JP | 2010088019 A | * | 4/2010 |
| JP | 2010-141730 A | | 6/2010 |
| JP | 2012-129634 A | | 7/2012 |
| JP | 2013-5017 A | | 1/2013 |
| JP | 2013-197841 A | | 9/2013 |
| JP | 2014-143498 A | | 8/2014 |
| JP | 2015-41890 A | | 3/2015 |
| JP | 2015-162735 A | | 9/2015 |

OTHER PUBLICATIONS

International Preliminary Report on Patentability and Written Opinion of the International Searching Authority (forms PCT/IB/373, PCT/ISA/237 and PCT/IB/326), dated Oct. 4, 2018, for corresponding International Application No. PCT/JP2016/086687, with a translation of the Written Opinion.
International Search Report (form PCT/ISA/210), dated Mar. 7, 2017, for corresponding International Application No. PCT/JP2016/086687, with an English translation.
Office Action dated Apr. 2, 2020 in correponding Chinese Patent Application No. 201680081954.7, with English translation.

* cited by examiner

DEVICE AND METHOD FOR CONTROLLING SOLID-STATE ELECTRONIC IMAGING DEVICE

CROSS-REFERENCE TO RELATED APPLICATIONS

This application is a Continuation of PCT International Application No. PCT/JP2016/086687 filed on Dec. 9, 2016, which claims priority under 35 U.S.C. § 119(a) to Japanese Patent Application No. 2016-059536 filed on Mar. 24, 2016. Each of the above application(s) is hereby expressly incorporated by reference, in its entirety, into the present application.

BACKGROUND OF THE INVENTION

1. Field of the Invention

The present invention relates to a device and method for controlling a solid-state electronic imaging device.

2. Description of the Related Art

For example, in a case in which the images of air and the surface of the water are captured at the same time and in a case in which the images of air and a mountain are captured at the same time, while the image of air is very bright, the image of, for example, the surface of the water or the mountain is relatively dark. Therefore, in the obtained object image, an air portion that is relatively bright is saturated or a water surface portion or a mountain portion that is relatively dark is saturated. As such, in a case in which the gradation of the obtained object image is reduced, a half neutral density (ND) filter may be attached to a front surface of an imaging lens of a camera in order to adjust incident light.

For example, the following imaging devices have been proposed: an imaging device in which the reading of charge from a photoelectric conversion unit in which a large amount of charge is accumulated is stopped and a long charge read time is set to a photoelectric conversion unit in which a small amount of charge is accumulated (JP2015-162735A); an imaging device in which odd-numbered lines and even-numbered lines have different exposure times (JP2015-41890A); an imaging device in which photodiodes in each line have different exposure times (JP2014-143498A); an imaging device in which a short exposure time is set to a bright region and a long exposure time is set to a dark region (JP2013-5017A); and an imaging device using a plurality of images with different exposure times (JP2006-14117A).

SUMMARY OF THE INVENTION

In a case in which the ND filter is not attached to the front surface of the imaging lens and a relatively bright portion and a relatively dark portion are captured as one object, the control of the exposure time of the photoelectric conversion element for each portion of the light receiving surface is considered as described in JP2015-162735A to JP2006-14117A. However, the structure of the imaging device needs to be changed in order to control the exposure time of the photoelectric conversion element.

An object of the invention is to provide a technique that can change the exposure amount of a photoelectric conversion element in each portion of a light receiving surface of an imaging device, without changing the structure of the imaging device.

According to the invention, there is provided a device for controlling a solid-state electronic imaging device. The device comprises: a solid-state electronic imaging device in which a plurality of photoelectric conversion elements are arranged in a row direction and a column direction and which comprises a pulse output circuit that outputs a reset pulse, which is applied to the photoelectric conversion element to reset signal charge accumulated in the photoelectric conversion element, to each row or each column in synchronization with a synchronizing signal and outputs a read pulse, which is applied to the photoelectric conversion element to read the signal charge accumulated in the photoelectric conversion element, to each row or each column in synchronization with the synchronizing signal; and a synchronizing signal output circuit that sequentially outputs the synchronizing signal to the pulse output circuit while changing an output interval.

The invention also provides a method for controlling a solid-state electronic imaging device. That is, there is provided a method for controlling a solid-state electronic imaging device in which a plurality of photoelectric conversion elements are arranged in a row direction and a column direction and which comprises a pulse output circuit that outputs a reset pulse, which is applied to the photoelectric conversion element to reset signal charge accumulated in the photoelectric conversion element, to each row or each column in synchronization with a synchronizing signal and outputs a read pulse, which is applied to the photoelectric conversion element to read the signal charge accumulated in the photoelectric conversion element, to each row or each column in synchronization with the synchronizing signal. The method comprises allowing a synchronizing signal output circuit to sequentially output the synchronizing signal to the pulse output circuit while changing an output interval.

For example, the synchronizing signal output circuit changes the output interval of the synchronizing signal with which the reset pulse for resetting the signal charge accumulated in the photoelectric conversion elements after the photoelectric conversion elements in a predetermined row or a predetermined column and the read pulse for reading the signal charge accumulated in the photoelectric conversion elements after the photoelectric conversion elements in a predetermined row or a predetermined column are synchronized.

For example, the output interval of the synchronizing signal before the output interval is changed is a first output period and the output interval of the synchronizing signal after the output interval is changed is a second output period.

The output interval of the synchronizing signal before the output interval is changed may be constant and the output interval of the synchronizing signal after the output interval is changed may vary.

The output interval of the synchronizing signal before the output interval is changed may be constant and the output interval of the synchronizing signal after the output interval is changed may be lengthened with a delay of an output time.

The output interval of the synchronizing signal after the output interval is changed may be longer than the output interval of the synchronizing signal before the output interval is changed. The output interval of the synchronizing signal after the output interval is changed may be shorter than the output interval of the synchronizing signal before the output interval is changed.

The pulse output circuit may comprise: a first pulse output circuit that sequentially outputs the reset pulse, which is applied to the photoelectric conversion element to reset the signal charge accumulated in the photoelectric conversion element, to each row in synchronization with the synchronizing signal and sequentially outputs the read pulse, which is applied to the photoelectric conversion element to read the signal charge accumulated in the photoelectric conversion element, to each row in synchronization with the synchronizing signal; and a second pulse output circuit that sequentially outputs the reset pulse, which is applied to the photoelectric conversion element to reset the signal charge accumulated in the photoelectric conversion element, to each column in synchronization with the synchronizing signal and sequentially outputs the read pulse, which is applied to the photoelectric conversion element to read the signal charge accumulated in the photoelectric conversion element, to each column in synchronization with the synchronizing signal. In this case, the synchronizing signal output circuit outputs the synchronizing signal to the first pulse output circuit or the second pulse output circuit.

The solid-state electronic imaging device is, for example, a CMOS imaging device.

The device for controlling a solid-state electronic imaging device may further comprise an exposure amount calculation device (exposure amount calculation means) for calculating an amount of exposure of each portion of an object using the signal charge accumulated in the photoelectric conversion elements. In this case, for example, the synchronizing signal output circuit outputs the synchronizing signal, with which the reset pulse and the read pulse for obtaining the amount of exposure of each portion of the object calculated by the exposure amount calculation device are synchronized, to the pulse output circuit.

The device for controlling a solid-state electronic imaging device may further comprise a switching device (switching means) for switching an order in which the reset pulse and the read pulse are applied to the photoelectric conversion elements to the row direction or a direction opposite to the row direction, or to the column direction or a direction opposite to the column direction.

According to the invention, in the solid-state electronic imaging device, a plurality of photoelectric conversion elements are arranged in the row direction and the column direction. The reset pulse is applied to the photoelectric conversion element to reset the signal charge accumulated in the photoelectric conversion element and the read pulse is applied to the photoelectric conversion element to read the signal charge accumulated in the photoelectric conversion element. The pulse output circuit outputs the reset pulse and the read pulse to each row or each column in synchronization with the synchronizing signal. According to the invention, since the output interval of the synchronizing signal is changed, the output interval of the reset pulse and the read pulse synchronized with the synchronizing signal is also changed. Since the period from the output of the reset pulse to the output of the read pulse is the exposure time of the photoelectric conversion element, it is possible to change the amount of exposure of the photoelectric conversion element in each row or each column (each portion of the light receiving surface of the solid-state electronic imaging device) only by changing the output interval of the synchronizing signal, without changing the structure of the solid-state electronic imaging device.

DESCRIPTION OF THE PREFERRED EMBODIMENTS

Figure 1:
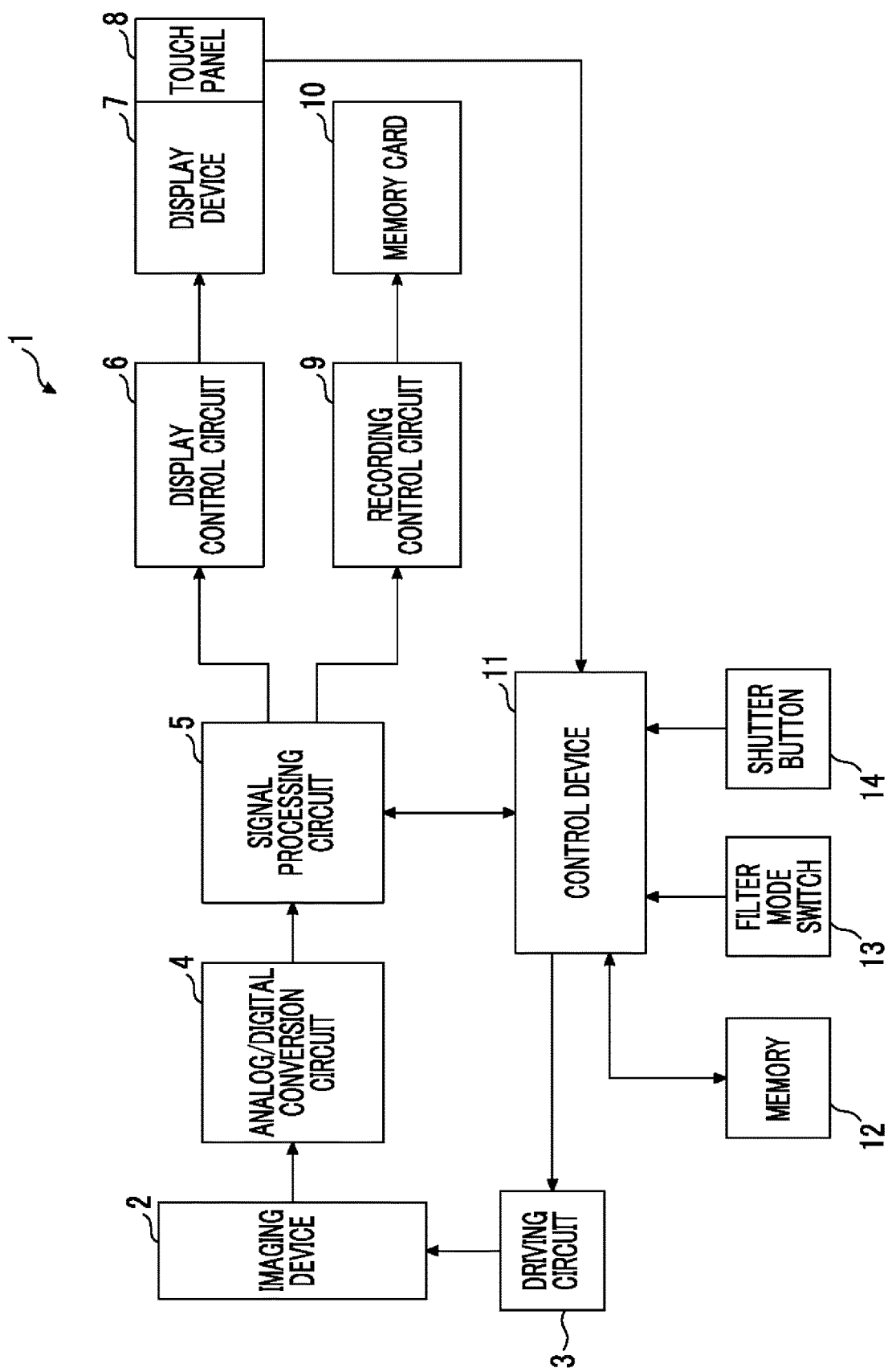
FIG. 1 is a block diagram illustrating the electric configuration of a digital camera.

FIG. 1 illustrates an embodiment of the invention and is a block diagram illustrating the electric configuration of a digital camera 1.

The overall operation of the digital camera 1 is controlled by a control device 11.

The digital camera 1 includes an imaging device 2 (solid-state electronic imaging device) that is driven by a driving circuit 3 (synchronizing signal output circuit). In a case in which the driving circuit 3 drives the imaging device 2, the imaging device 2 captures an image of an object and a video signal indicating the object image is output from the imaging device 2. The video signal output from the imaging device 2 is input to an analog/digital conversion circuit 4. The analog/digital conversion circuit 4 converts the video signal into digital image data.

The digital image data is input to a signal processing circuit 5 and predetermined signal processing, such as gamma correction or white balance adjustment, is performed for the digital image data. The digital image data output from the signal processing circuit 5 is transmitted to a display control circuit 6. The object image is displayed on a display screen of a display device 7 under the control of the display control circuit 6.

In a case in which a shutter button 14 is pressed, a shutter release signal is input to the control device 11. Then, as described above, the imaging device 2 captures the image of the object and the video signal indicating the object image is output from the imaging device 2. The analog/digital conversion circuit 4 converts the video signal into digital image data and the signal processing circuit 5 performs predetermined signal processing for the digital image data. The digital image data output from the signal processing circuit 5 is input to a recording control circuit 9. The recording control circuit 9 records the digital image data on a memory card 10.

The digital camera 1 is provided with a filter mode switch 13 that sets a filter mode. A filter mode setting signal output from the filter mode switch 13 is input to the control device 11. In a filter mode, for example, the imaging device 2 outputs the same video signal as that obtained in a case in which a desired filter, such as a half neutral density (ND) filter, is attached in front of an imaging surface of the imaging device 2.

A touch panel 8 is formed on the display screen of the display device 7. In a case in which the touch panel 8 is operated, signals indicating various commands are generated and the command signals are input to the control device 11. In addition, a memory 12 that stores predetermined data is connected to the control device 11.

Figure 2:
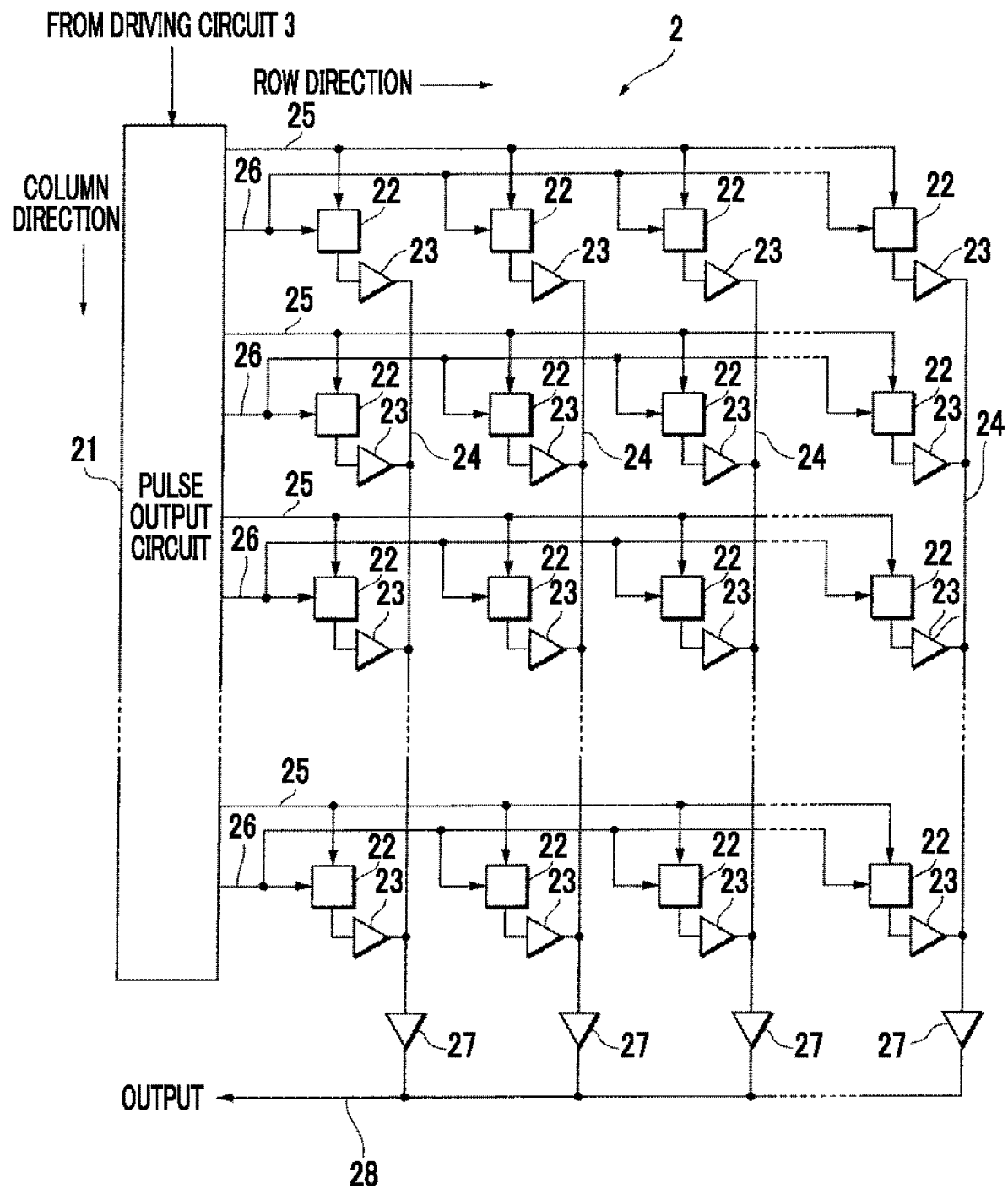
FIG. 2 is a block diagram illustrating the electric configuration of an imaging device.

FIG. 2 is a block diagram illustrating the electric configuration of the imaging device 2.

The imaging device 2 illustrated in FIG. 2 is a complementary metal oxide semiconductor (CMOS) imaging device.

In the imaging device 2, a plurality of photoelectric conversion elements (photodiodes) 22 are arranged in a row direction (horizontal direction) and a column direction (vertical direction). An amplification circuit 23 is connected to the photoelectric conversion element 22. The amplification circuits 23 in each column are connected to a common vertical signal line 24 in each column. A correlated double sampling (CDS) circuit 27 is connected to each vertical signal line 24. An output of the CDS circuit 27 is connected to a first output line 28.

A common reset pulse line 25 and a common read pulse line 26 in each row are connected to the photoelectric conversion elements 22 in each row.

The driving circuit 3 outputs a synchronizing signal (horizontal synchronizing signal) HD (horizontal driving pulse) to the imaging device 2. The synchronizing signal HD is input to a pulse output circuit 21. Then, the pulse output circuit 21 outputs a reset pulse synchronized with the synchronizing signal HD to each reset pulse line 25. In addition, the pulse output circuit 21 outputs a read pulse synchronized with the synchronizing signal HD to each read pulse line 26. In a case in which the pulse output circuit 21 outputs the reset pulse to each reset pulse line 25, the reset pulse is applied to the photoelectric conversion elements 22 in the same row which are connected to the reset pulse line 25 to which the reset pulse has been output. Then, the photoelectric conversion elements 22 in the same row, to which the reset pulse has been output, are reset and signal charge accumulated in the photoelectric conversion elements 22 is swept out (for example, unnecessary charge is swept out from a substrate). In a case in which the pulse output circuit 21 outputs the read pulse to each read pulse line 26, the signal charge accumulated in the photoelectric conversion elements 22 in the same row connected to the read pulse line 26, to which the read pulse has been output, is transmitted to the amplification circuit 23. The signal charge is changed into a video signal by the amplification circuit 23 and is transmitted to the vertical signal line 24. The CDS circuit 27 connected to the vertical signal line 24 performs correlated double sampling for the video signal. The sampled video signal is output as a video signal from the first output line 28 to the imaging device 2. The reset pulse and the read pulse are transmitted to each of the photoelectric conversion elements 22 in each row and the video signal indicating the object image for each row is output from the imaging device 2. The reset pulse and the read pulse are sequentially output from the pulse output circuit 21 in the column direction or a direction opposite to the column direction.

Figure 3:
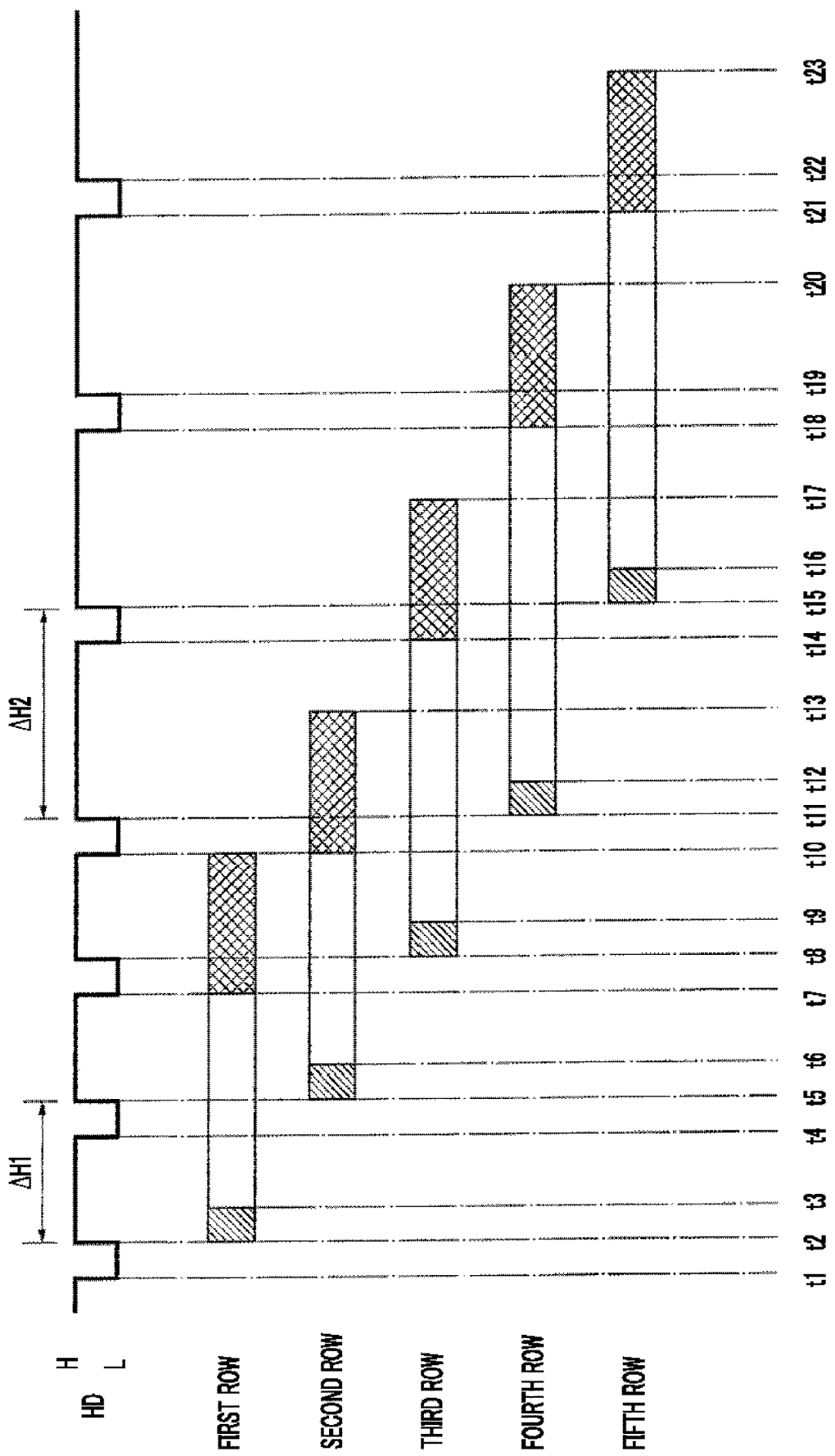
FIG. 3 is a timing chart illustrating a reading process of the imaging device.

FIG. 3 is a timing chart illustrating a reading process of the imaging device 2 in a case in which the filter mode switch 13 sets the filter mode.

In a case in which the filter mode is set, the output interval of the synchronizing signal HD from the driving circuit 3 is changed for a period (for one period of the vertical synchronizing signal) corresponding to one screen (one object image). In addition, the output interval of the synchronizing signal HD may be changed by one period of a vertical synchronizing signal (the vertical synchronizing signal is output from the driving circuit 3 to the imaging device 2) which is output immediately after the filter mode is set and the shutter button 14 is pressed. Digital image data indicating the object image, in which the amounts of exposure of portions are different from each other, is recorded on the memory card 10. In addition, the filter mode may be set even in a case in the shutter button 14 is not pressed and the output interval of the synchronizing signal HD may be changed for one period of the vertical synchronizing signal. A change in the output interval of the synchronizing signal HD is repeated for each period of the vertical synchronizing signal. The object image obtained in a case in which the ND filter is attached to the light receiving surface of the imaging device 2 is displayed on the display screen of the display device 7.

The synchronizing signal HD is at an L level for a period from a time t1 to a time t2, a period from a time t4 to a time t5, a period from a time t7 to a time t8, a period from a time t10 to a time t11, a period from a time t14 to a time t15, a period from a time t18 to a time t19, and a period from a time t21 to a time t22. In addition, the synchronizing signal HD is at an H level for a period from the time t2 to the time t4, a period from the time t5 to the time t7, a period from the time t8 to the time t10, a period from the time t11 to the time t14, a period from the time t15 to the time t18, and a period from the time t19 to the time t21. After the time t22, the L level and the H level of the synchronizing signal HD are repeated.

The output period of the synchronizing signal HD until the time t11 is ΔH1 and the output period of the synchronizing signal HD after the time t11 is ΔH2 that is longer than ΔH1.

The pulse output circuit 21 applies the reset pulse to the photoelectric conversion elements 22 in the first row in synchronization with the synchronizing signal HD for the period from the time t2 to the time t3 (the reset pulse applied to the photoelectric conversion element 22 is represented by hatching). In a case in which the reset pulse is applied to the photoelectric conversion elements 22 in the first row, the signal charge accumulated in the photoelectric conversion elements 22 in the first row is swept out. At the time t3, the application of the reset pulse to the photoelectric conversion elements 22 in the first row is stopped. At the time t7, the application of the read pulse to the photoelectric conversion elements 22 in the first row starts in synchronization with the synchronizing signal HD (the read pulse applied to the photoelectric conversion elements 22 is represented by cross hatching). The period from the time t3 when the application of the reset pulse to the photoelectric conversion elements 22 in the first row is stopped to the time t7 when the application of the read pulse starts is the exposure period of the photoelectric conversion elements 22 in the first row. For the exposure period, signal charge is accumulated in the photoelectric conversion elements 22 in the first row.

The pulse output circuit 21 applies the reset pulse to the photoelectric conversion elements 22 in a second row for the period from the time t5 to the time t6. In a case in which the reset pulse is applied to the photoelectric conversion elements 22 in the second row, the signal charge accumulated in the photoelectric conversion elements 22 in the second row is swept out. At the time t6, the application of the reset pulse to the photoelectric conversion elements 22 in the second row is stopped. At the time t10, the application of the read pulse to the photoelectric conversion elements 22 in the second row starts. The period from the time t6 when the application of the reset pulse to the photoelectric conversion elements 22 in the second row is stopped to the time t10 when the application of the read pulse starts is the exposure period of the photoelectric conversion elements 22 in the second row. For the exposure period, signal charge is accumulated in the photoelectric conversion elements 22 in the second row.

Similarly, the reset pulse is applied to the photoelectric conversion elements 22 in a third row for the period from the time t8 to the time t9 and the read pulse is applied to the photoelectric conversion elements 22 in the third row for the period from the time t14 to the time t17. The period from the time t9 to the time t14 is the exposure period of the photoelectric conversion elements 22 in the third row. For the exposure period, signal charge is accumulated in the photoelectric conversion elements 22 in the third row.

The reset pulse is applied to the photoelectric conversion elements 22 in a fourth row for the period from the time t11 to the time t12 and the read pulse is applied to the photoelectric conversion elements 22 in the fourth row for the period from the time t18 to the time t20. The period from the time t12 to the time t18 is the exposure period of the photoelectric conversion elements 22 in the fourth row. For the exposure period, signal charge is accumulated in the photoelectric conversion elements 22 in the fourth row.

The reset pulse is applied to the photoelectric conversion elements 22 in a fifth row for the period from the time t15 to the time t16 and the read pulse is applied to the photoelectric conversion elements 22 in the fifth row for the period from the time t21 to the time t23. The period from the time t16 to the time t21 is the exposure period of the photoelectric conversion elements 22 in the fifth row. For the exposure period, signal charge is accumulated in the photoelectric conversion elements 22 in the fifth row. The reset pulse and the read pulse are applied to the photoelectric conversion elements 22 in the sixth and subsequent rows by the same method as described above.

For the period from the time t9 to the time t14 which is the exposure period of the photoelectric conversion elements 22 in the third row, the period of the synchronizing signal HD is lengthened from $\Delta H1$ to $\Delta H2$. The period of the synchronizing signal HD is extended after the exposure period of the photoelectric conversion elements 22 in the second row elapses. Therefore, the exposure period of the photoelectric conversion elements 22 in the first row is equal to the exposure period of the photoelectric conversion elements 22 in the second row and the exposure period of the photoelectric conversion elements 22 in the third row is longer than the exposure period of the photoelectric conversion elements 22 in the first row and the exposure period of the photoelectric conversion elements 22 in the second row. The exposure period of the photoelectric conversion elements 22 in the fourth and subsequent rows starts after the period of the synchronizing signal HD is extended and thus is longer than the exposure period of the photoelectric conversion elements 22 in the third row.

As such, the output interval of the synchronizing signal HD is changed (in FIG. 3, from the first output interval $\Delta H1$ before the output interval is changed to the second output interval $\Delta H2$ after the output interval is changed) and the synchronizing signal HD is sequentially output from the driving circuit 3 to the pulse output circuit 21 to control the exposure period of the photoelectric conversion elements 22. In the case illustrated in FIG. 3, the photoelectric conversion elements 22 in the first and second rows have a relatively short exposure period and the photoelectric conversion elements 22 in the third and subsequent rows have a relatively long exposure period. Therefore, the same video signal as that obtained from the imaging device 2 in a case in which the ND filter is provided on the front surface of the imaging device 2 is obtained.

In the example illustrated in FIG. 3, the output interval of the synchronizing signal HD before it is changed is short and the output interval of the synchronizing signal HD after it is changed is long. Therefore, the exposure time of the photoelectric conversion elements 22 in the former rows is relatively short and the exposure time of the photoelectric conversion elements 22 in the latter rows is relatively long. As a result, this configuration is suitable for an object in which an upper portion is relatively bright and a lower portion is relatively dark (in a case in which the photoelectric conversion elements 22 in the former rows are used to indicate the upper portion of the object and the photoelectric conversion elements 22 in the latter rows are used to indicate the lower portion of the object; this configuration is suitable for an object in which an upper portion is relatively dark and a lower portion is relatively bright in a case in which the photoelectric conversion elements 22 in the former rows are used to indicate the lower portion of the object and the photoelectric conversion elements 22 in the latter rows are used to indicate the upper portion of the object).

In the example illustrated in FIG. 3, since the output interval of the synchronizing signal HD is changed from $\Delta H1$ to $\Delta H2$ at the time t11, the output interval of the reset pulse which is output before the time t11 and is applied to the photoelectric conversion elements 22 in the first to fourth rows is not changed and the output interval of the reset pulse applied to the photoelectric conversion elements 22 in the fourth and subsequent rows is changed. It may be considered that the output interval of the synchronizing signal HD, with which the reset pulse for resetting the signal charge accumulated in the photoelectric conversion elements 22 after the photoelectric conversion elements 22 in the fourth row (predetermined row) is synchronized, is changed.

In the example illustrated in FIG. 3, since the output interval of the synchronizing signal HD is changed from $\Delta H1$ to $\Delta H2$ at the time t11, the output interval of the read pulse which starts to be output before the time t11 and is applied to the photoelectric conversion elements 22 in the first and second rows and the output interval of the read pulse applied to the photoelectric conversion elements 22 in the third and subsequent rows are changed. It may be considered that the output interval of the synchronizing signal HD, with which the read pulse for reading the signal charge accumulated in the photoelectric conversion elements 22 after the photoelectric conversion elements 22 in the third row (predetermined row) is synchronized, is changed.

In the above-described embodiment, the reset pulse and the read pulse are sequentially applied to the photoelectric conversion elements 22 from the photoelectric conversion elements 22 in the first row in the column direction (the reset pulse and the read pulse are sequentially applied to the photoelectric conversion element 22 in the column direction). However, the reset pulse and the read pulse may be sequentially applied to the photoelectric conversion elements 22 from the photoelectric conversion elements 22 in the last row in the direction opposite to the column direction (the reset pulse and the read pulse are sequentially applied to the photoelectric conversion elements 22 in the direction opposite to the column direction).

In a case in which the imaging device 2 does not apply the reset pulse and the read pulse to the photoelectric conversion elements 22 in the same row, but applies the reset pulse and the read pulse to the photoelectric conversion elements 22 in the same column as described below, the reset pulse and the read pulse are sequentially applied to the photoelectric conversion elements 22 from the photoelectric conversion elements 22 in the first column in the row direction (the reset pulse and the read pulse are sequentially applied to the photoelectric conversion element 22 in the row direction). However, the reset pulse and the read pulse may be sequentially applied to the photoelectric conversion elements 22 from the photoelectric conversion elements 22 in the last column in the direction opposite to the row direction (the reset pulse and the read pulse are sequentially applied to the photoelectric conversion element 22 in the direction opposite to the row direction).

Figure 8:
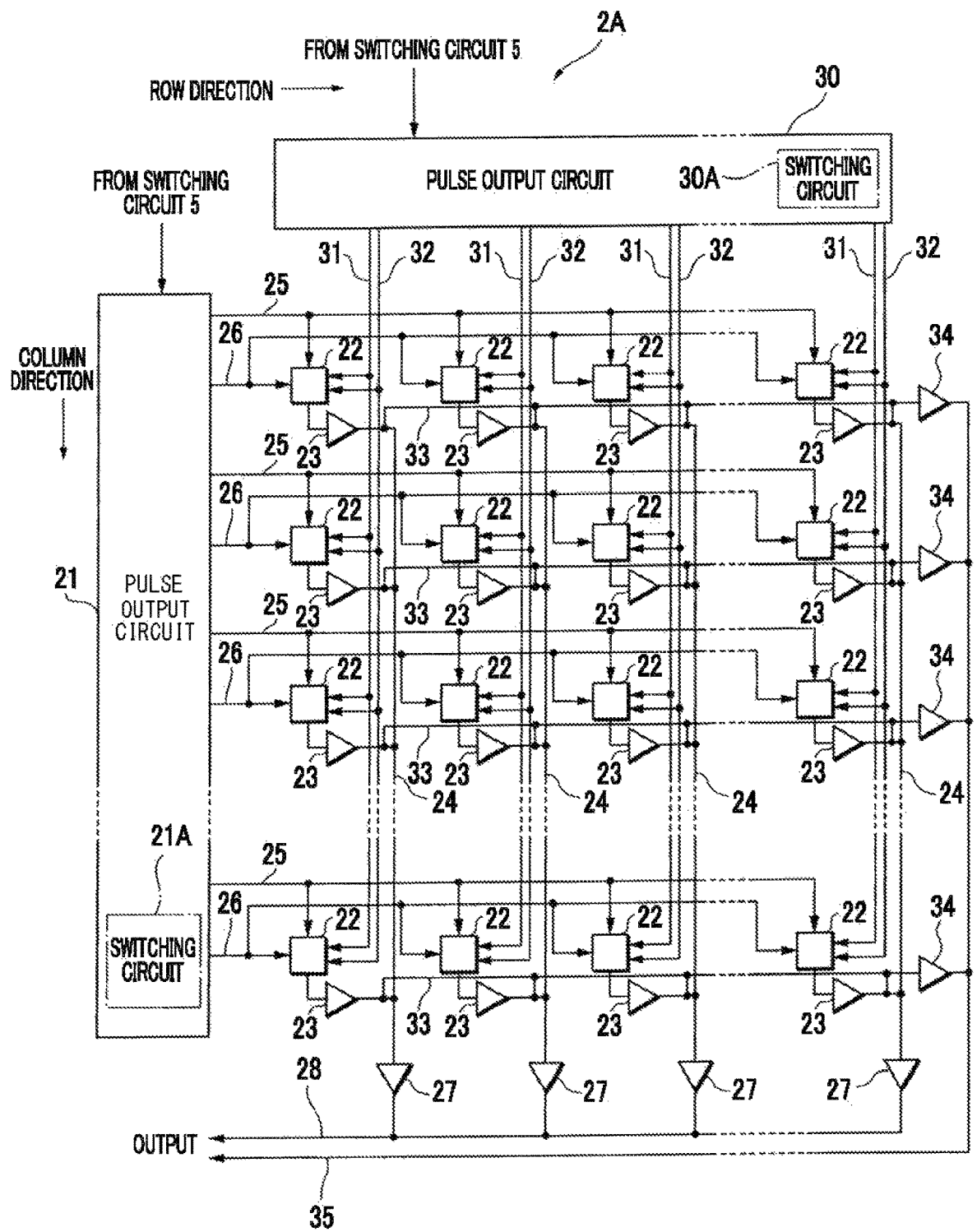
FIG. 8 is a block diagram illustrating the electric configuration of an imaging device.

For example, whether the reset pulse and the read pulse are applied to the photoelectric conversion elements 22 in the row direction (or the column direction) or the direction opposite to the row direction (or the direction opposite to the column direction) may be controlled as follows: the driving circuit 3 (a switching device) transmits a control signal to the pulse output circuit 21; and the order in which the reset pulse and the read pulse output from the pulse output circuit 21 are applied is controlled on the basis of the control signal. A switching circuit 21A that changes the order in which the reset pulse and the read pulse are applied may be provided in the pulse output circuit 21 as illustrated in FIG. 8 which will be described below. Of course, the order in which the reset pulse and the read pulse are applied may be changed by other methods.

Figure 4:
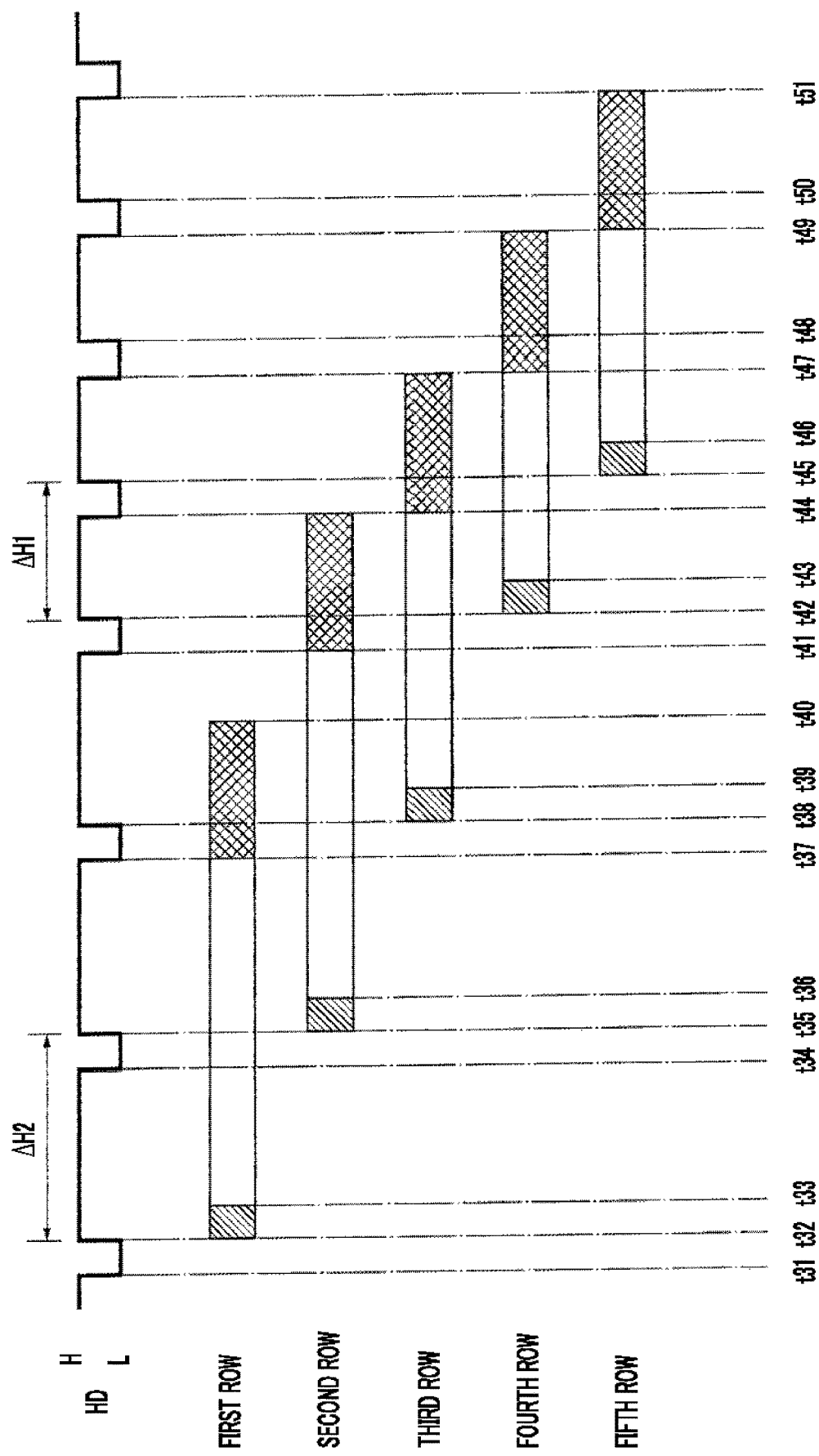
FIG. 4 is a timing chart illustrating a reading process of the imaging device.

FIG. 4 illustrates another embodiment and is a timing chart illustrating a reading process of the imaging device 2.

In the timing chart illustrated in FIG. 3, the output interval of the synchronizing signal HD after it is changed is longer than the output interval of the synchronizing signal HD before it is changed. However, in the timing chart illustrated in FIG. 4, the output interval of the synchronizing signal HD after it is changed is shorter than the output interval of the synchronizing signal HD before it is changed.

The synchronizing signal HD is at an L level for a period from a time t31 to a time t32, a period from a time t34 to a time t35, a period from a time t37 to a time t38, a period from a time t41 to a time t42, a period from a time t44 to a time t45, a period from a time t47 to a time t48, and a period from a time t49 to a time t50. The synchronizing signal HD is at an H level for a period from the time t32 to the time t34, a period from the time t35 to the time t37, a period from the time t38 to the time t41, a period from the time t42 to the time t44, a period from the time t45 to the time t47, a period from the time t48 to the time t49, and a period from the time t50 to a time t51. After the time t51, the L level and the H level of the synchronizing signal HD are repeated.

The output interval of the synchronizing signal HD until the time t42 is ΔH2 and the output interval of the synchronizing signal HD after the time t42 is ΔH1 that is shorter than ΔH2.

The pulse output circuit 21 applies the reset pulse to the photoelectric conversion elements 22 in the first row in synchronization with the synchronizing signal HD for the period from the time t32 to the time t33. In a case in which the reset pulse is applied to the photoelectric conversion elements 22 in the first row, the signal charge accumulated in the photoelectric conversion elements 22 in the first row is swept out. At the time t37, the application of the read pulse to the photoelectric conversion elements 22 in the first row starts in synchronization with the synchronizing signal HD. The period from the time t33 when the application of the reset pulse to the photoelectric conversion elements 22 in the first row is stopped to the time t37 when the application of the read pulse starts is the exposure period of the photoelectric conversion elements 22 in the first row. For the exposure period, signal charge is accumulated in the photoelectric conversion elements 22 in the first row.

The pulse output circuit 21 applies the reset pulse to the photoelectric conversion elements 22 in a second row for the period from the time t35 to the time t36. In a case in which the reset pulse is applied to the photoelectric conversion elements 22 in the second row, the signal charge accumulated in the photoelectric conversion elements 22 in the second row is swept out. At the time t41, the application of the read pulse to the photoelectric conversion elements 22 in the second row starts. The period from the time t36 when the application of the reset pulse to the photoelectric conversion elements 22 in the second row is stopped to the time t41 when the application of the read pulse starts is the exposure period of the photoelectric conversion elements 22 in the second row. For the exposure period, signal charge is accumulated in the photoelectric conversion elements 22 in the second row.

Similarly, the reset pulse is applied to the photoelectric conversion elements 22 in a third row for the period from the time t38 to the time t39 and the read pulse is applied to the photoelectric conversion elements 22 in the third row for the period from the time t44 to the time t47. The period from the time t39 to the time t44 is the exposure period of the photoelectric conversion elements 22 in the third row. For the exposure period, signal charge is accumulated in the photoelectric conversion elements 22 in the third row.

The reset pulse is applied to the photoelectric conversion elements 22 in a fourth row for the period from the time t42 to the time t43 and the read pulse is applied to the photoelectric conversion elements 22 in the fourth row for the period from the time t47 to the time t49. The period from the time t43 to the time t47 is the exposure period of the photoelectric conversion elements 22 in the fourth row. For the exposure period, signal charge is accumulated in the photoelectric conversion elements 22 in the fourth row.

The reset pulse is applied to the photoelectric conversion elements 22 in a fifth row for the period from the time t45 to the time t46 and the read pulse is applied to the photoelectric conversion elements 22 in the fifth row for the period from the time t49 to the time t51. The period from the time t46 to the time t49 is the exposure period of the photoelectric conversion elements 22 in the fifth row. For the exposure period, signal charge is accumulated in the photoelectric conversion elements 22 in the fifth row. The reset pulse and the read pulse are applied to the photoelectric conversion elements 22 in the sixth and subsequent rows by the same method as described above.

The output interval of the synchronizing signal HD for the period from the time t39 to the time t44 which is the exposure period of the photoelectric conversion elements 22 in the third row is shortened from ΔH2 to ΔH1. The output interval of the synchronizing signal HD is shortened after the exposure period of the photoelectric conversion elements 22 in the second row elapses. Therefore, the exposure period of the photoelectric conversion elements 22 in the first row is equal to the exposure period of the photoelectric conversion elements 22 in the second row and the exposure period of the photoelectric conversion elements 22 in the third row is shorter than the exposure period of the photoelectric conversion elements 22 in the first row and the exposure period of the photoelectric conversion elements 22 in the second row. The exposure period of the photoelectric conversion elements 22 in the fourth and subsequent rows starts after the period of the synchronizing signal HD is shortened and thus is shorter than the exposure period of the photoelectric conversion elements 22 in the third row.

In the example illustrated in FIG. 4, the exposure period of the photoelectric conversion elements 22 in the first and second rows is relatively long and the exposure period of the photoelectric conversion elements 22 in the third and subsequent rows is relatively short. Therefore, the same video signal as that obtained from the imaging device 2 in a case in which the ND filter is provided on the front surface of the imaging device 2 is obtained.

In the example illustrated in FIG. 4, the output interval of the synchronizing signal HD before it is changed is long and the output interval of the synchronizing signal HD after it is changed is short. Therefore, the exposure time of the photoelectric conversion elements 22 in the former rows is relatively long and the exposure time of the photoelectric conversion elements 22 in the latter rows is relatively short. As a result, this configuration is suitable for an object in which an upper portion is relatively dark and a lower portion is relatively bright (in a case in which the photoelectric conversion elements 22 in the former rows are used to indicate the upper portion of the object and the photoelectric conversion elements 22 in the latter rows are used to indicate the lower portion of the object; this configuration is suitable for an object in which an upper portion is relatively bright and a lower portion is relatively dark in a case in which the photoelectric conversion elements 22 in the former rows are used to indicate the lower portion of the object and the photoelectric conversion elements 22 in the latter rows are used to indicate the upper portion of the object).

In the above-described embodiment, the reset pulse and the read pulse are sequentially applied to the photoelectric conversion elements 22 from the photoelectric conversion elements 22 in the first row in the column direction (the reset pulse and the read pulse are sequentially applied to the photoelectric conversion element 22 in the column direction). However, the reset pulse and the read pulse may be sequentially applied to the photoelectric conversion elements 22 from the photoelectric conversion elements 22 in the last row in the direction opposite to the column direction (the reset pulse and the read pulse are sequentially applied to the photoelectric conversion elements 22 in the direction opposite to the column direction).

In a case in which the imaging device 2 does not apply the reset pulse and the read pulse to the photoelectric conversion elements 22 in the same row, but can apply the reset pulse and the read pulse to the photoelectric conversion elements 22 in the same column as described below, the reset pulse and the read pulse are sequentially applied to the photoelectric conversion elements 22 from the photoelectric conversion elements 22 in the first column in the row direction (the reset pulse and the read pulse are sequentially applied to the photoelectric conversion element 22 in the row direction). However, the reset pulse and the read pulse may be sequentially applied to the photoelectric conversion elements 22 from the photoelectric conversion elements 22 in the last column in the direction opposite to the row direction (the reset pulse and the read pulse are sequentially applied to the photoelectric conversion element 22 in the direction opposite to the row direction).

Figure 5:
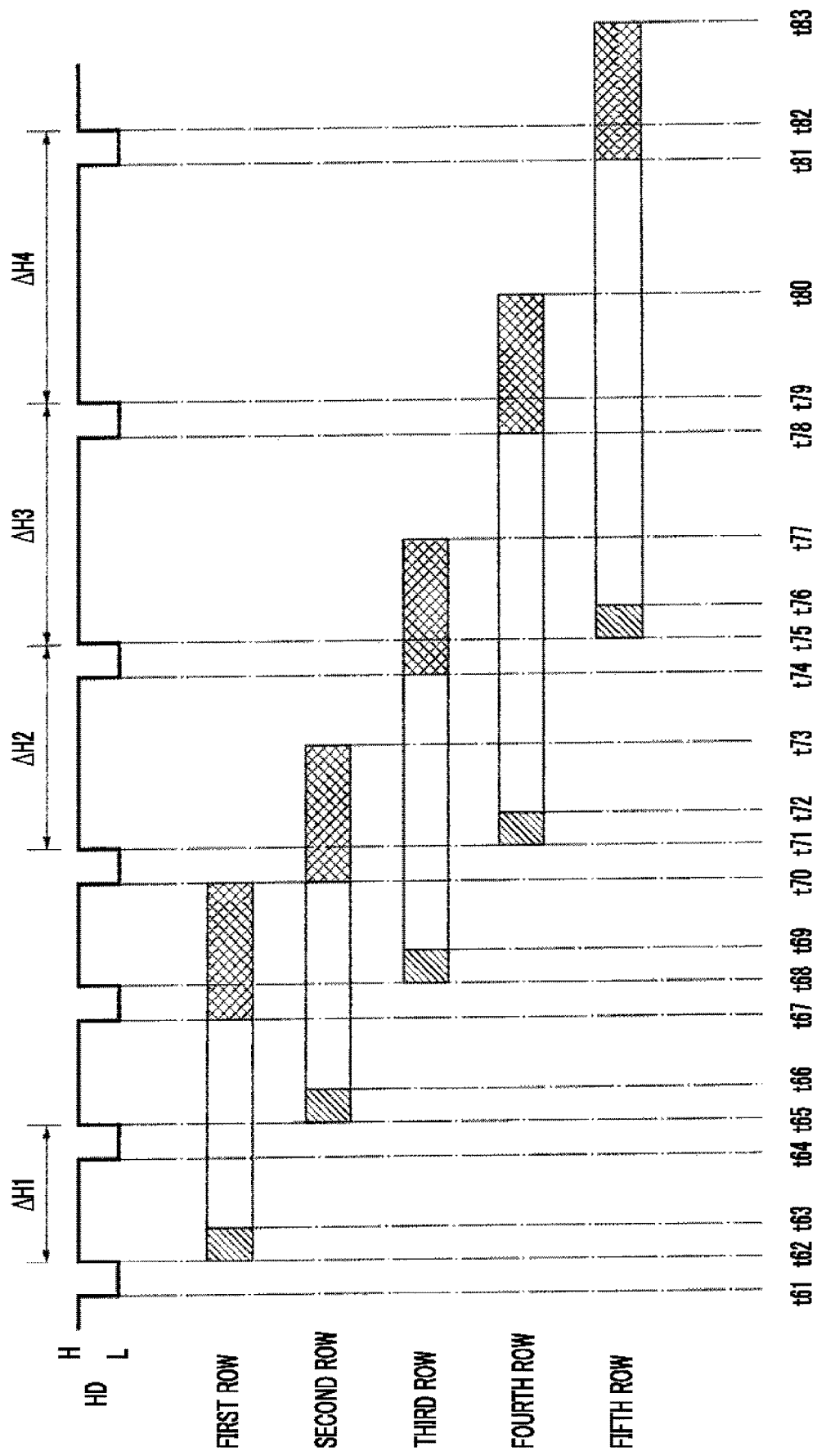
FIG. 5 is a timing chart illustrating a reading process of the imaging device.

FIG. 5 illustrates still another embodiment and is a timing chart illustrating a reading process of the imaging device 2.

In the timing chart illustrated in FIG. 5, the output interval of the synchronizing signal HD after it is changed is lengthened with the delay of output time. The output interval of the synchronizing signal HD after it is changed may be periodic and the output period may be changed.

The synchronizing signal HD is at an L level for a period from a time t61 to a time t62, a period from a time t64 to a time t65, a period from a time t67 to a time t68, a period from a time t70 to a time t71, a period from a time t74 to a time t75, a period from a time t78 to a time t79, and a period from a time t81 to a time t82. The synchronizing signal HD is at an H level for a period from the time t62 to the time t64, a period from the time t65 to the time t67, a period from the time t68 to the time t70, a period from the time t71 to the time t74, a period from the time t75 to the time t78, and a period from the time t79 to the time t81. After the time t82, the L level and the H level of the synchronizing signal HD are repeated.

The output interval of the synchronizing signal HD until the time t71 is ΔH1 and the output interval of the synchronizing signal HD after the time t71 is lengthened with the delay of the output time. For example, the output interval of the synchronizing signal HD immediately after the time t71 when the output interval is changed is ΔH2 that is slightly longer than the output interval ΔH1. In addition, the output interval of the synchronizing signal HD at the time t75 when the output time is delayed is ΔH3 that is slightly longer than the output interval ΔH2. Furthermore, the output interval of the synchronizing signal HD at the time t79 when the output time is delayed is ΔH4 that is slightly longer than the output interval ΔH3.

The pulse output circuit 21 applies the reset pulse to the photoelectric conversion elements 22 in the first row in synchronization with the synchronizing signal HD for the period from the time t62 to the time t63. In a case in which the reset pulse is applied to the photoelectric conversion elements 22 in the first row, the signal charge accumulated in the photoelectric conversion elements 22 in the first row is swept out. At the time t67, the application of the read pulse to the photoelectric conversion elements 22 in the first row starts in synchronization with the synchronizing signal HD. The period from the time t63 when the application of the reset pulse to the photoelectric conversion elements 22 in the first row is stopped to the time t67 when the application of the read pulse starts is the exposure period of the photoelectric conversion elements 22 in the first row. For the exposure period, signal charge is accumulated in the photoelectric conversion elements 22 in the first row.

The pulse output circuit 21 applies the reset pulse to the photoelectric conversion elements 22 in a second row for the period from the time t65 to the time t66. In a case in which the reset pulse is applied to the photoelectric conversion elements 22 in the second row, the signal charge accumulated in the photoelectric conversion elements 22 in the second row is swept out. At the time t70, the application of the read pulse to the photoelectric conversion elements 22 in the second row starts. The period from the time t66 when the application of the reset pulse to the photoelectric conversion elements 22 in the second row is stopped to the time t70 when the application of the read pulse starts is the exposure period of the photoelectric conversion elements 22 in the second row. For the exposure period, signal charge is accumulated in the photoelectric conversion elements 22 in the second row.

Similarly, the reset pulse is applied to the photoelectric conversion elements 22 in a third row for the period from the time t68 to the time t69 and the read pulse is applied to the photoelectric conversion elements 22 in the third row for the period from the time t74 to the time t7. The period from the time t69 to the time t74 is the exposure period of the photoelectric conversion elements 22 in the third row. For the exposure period, signal charge is accumulated in the photoelectric conversion elements 22 in the third row.

The reset pulse is applied to the photoelectric conversion elements 22 in a fourth row for the period from the time t71 to the time t72 and the read pulse is applied to the photoelectric conversion elements 22 in the fourth row for the period from the time t78 to the time t80. The period from the time t72 to the time t78 is the exposure period of the photoelectric conversion elements 22 in the fourth row. For the exposure period, signal charge is accumulated in the photoelectric conversion elements 22 in the fourth row.

The reset pulse is applied to the photoelectric conversion elements 22 in a fifth row for the period from the time t75 to the time t76 and the read pulse is applied to the photoelectric conversion elements 22 in the fifth row for the period from the time t81 to the time t83. The period from the time t76 to the time t81 is the exposure period of the photoelectric conversion elements 22 in the fifth row. For the exposure period, signal charge is accumulated in the photoelectric conversion elements 22 in the fifth row. The reset pulse and the read pulse are applied to the photoelectric conversion elements 22 in the sixth and subsequent rows by the same method as described above.

The output interval of the synchronizing signal HD for the period from the time t69 to the time t74 which is the exposure period of the photoelectric conversion elements 22 in the third row is lengthened from ΔH1 to ΔH2. The output interval of the synchronizing signal HD is lengthened after the exposure period of the photoelectric conversion elements 22 in the second row elapses. Therefore, the exposure period of the photoelectric conversion elements 22 in the first row is equal to the exposure period of the photoelectric conversion elements 22 in the second row and the exposure period of the photoelectric conversion elements 22 in the third row is longer than the exposure period of the photoelectric conversion elements 22 in the first row and the exposure period of the photoelectric conversion elements 22 in the second row. The output interval of the synchronizing signal HD for the period from the time t72 to the time t78 which is the exposure period of the photoelectric conversion elements 22 in the fourth row is further lengthened from ΔH2 to ΔH3. The exposure period of the photoelectric conversion elements 22 in the fourth row is longer than the exposure period of the photoelectric conversion elements 22 in the third row. In addition, the output interval of the synchronizing signal HD for the period from the time t76 to the time t81 which is the exposure period of the photoelectric conversion elements 22 in the fifth row is further lengthened from ΔH3 to ΔH4. The exposure period of the photoelectric conversion elements 22 in the fifth row is longer than the exposure period of the photoelectric conversion elements 22 in the fourth row.

In the case illustrated in FIG. 5, after the time t71 when the output interval of the synchronizing signal HD is changed, the output interval is lengthened with the delay of the output time of the synchronizing signal HD. The exposure time of the photoelectric conversion elements 22 after the photoelectric conversion elements 22 in the third row becomes longer as the number of rows becomes larger. This configuration is suitable for an object in which an upper portion is relatively bright, brightness is gradually reduced toward a lower portion, and the lower portion is relatively dark (in a case in which the photoelectric conversion elements 22 in the former rows are used to indicate the upper portion of the object and the photoelectric conversion elements 22 in the latter rows are used to indicate the lower portion of the object; this configuration is suitable for an object in which a lower portion is relatively bright, brightness is gradually reduced toward an upper portion, and the upper portion is relatively dark in a case in which the photoelectric conversion elements 22 in the former rows are used to indicate the lower portion of the object and the photoelectric conversion elements 22 in the latter rows are used to indicate the upper portion of the object).

In the above-described embodiment, the reset pulse and the read pulse are sequentially applied to the photoelectric conversion elements 22 from the photoelectric conversion elements 22 in the first row in the column direction (the reset pulse and the read pulse are sequentially applied to the photoelectric conversion element 22 in the column direction). However, the reset pulse and the read pulse may be sequentially applied to the photoelectric conversion elements 22 from the photoelectric conversion elements 22 in the last row in the direction opposite to the column direction (the reset pulse and the read pulse are sequentially applied to the photoelectric conversion elements 22 in the direction opposite to the column direction).

In a case in which the imaging device 2 does not apply the reset pulse and the read pulse to the photoelectric conversion elements 22 in the same row, but applies the reset pulse and the read pulse to the photoelectric conversion elements 22 in the same column as described below, the reset pulse and the read pulse are sequentially applied to the photoelectric conversion elements 22 from the photoelectric conversion elements 22 in the first column in the row direction (the reset pulse and the read pulse are sequentially applied to the photoelectric conversion element 22 in the row direction). However, the reset pulse and the read pulse may be sequentially applied to the photoelectric conversion elements 22 from the photoelectric conversion elements 22 in the last column in the direction opposite to the row direction (the reset pulse and the read pulse are sequentially applied to the photoelectric conversion element 22 in the direction opposite to the row direction).

Figure 6:
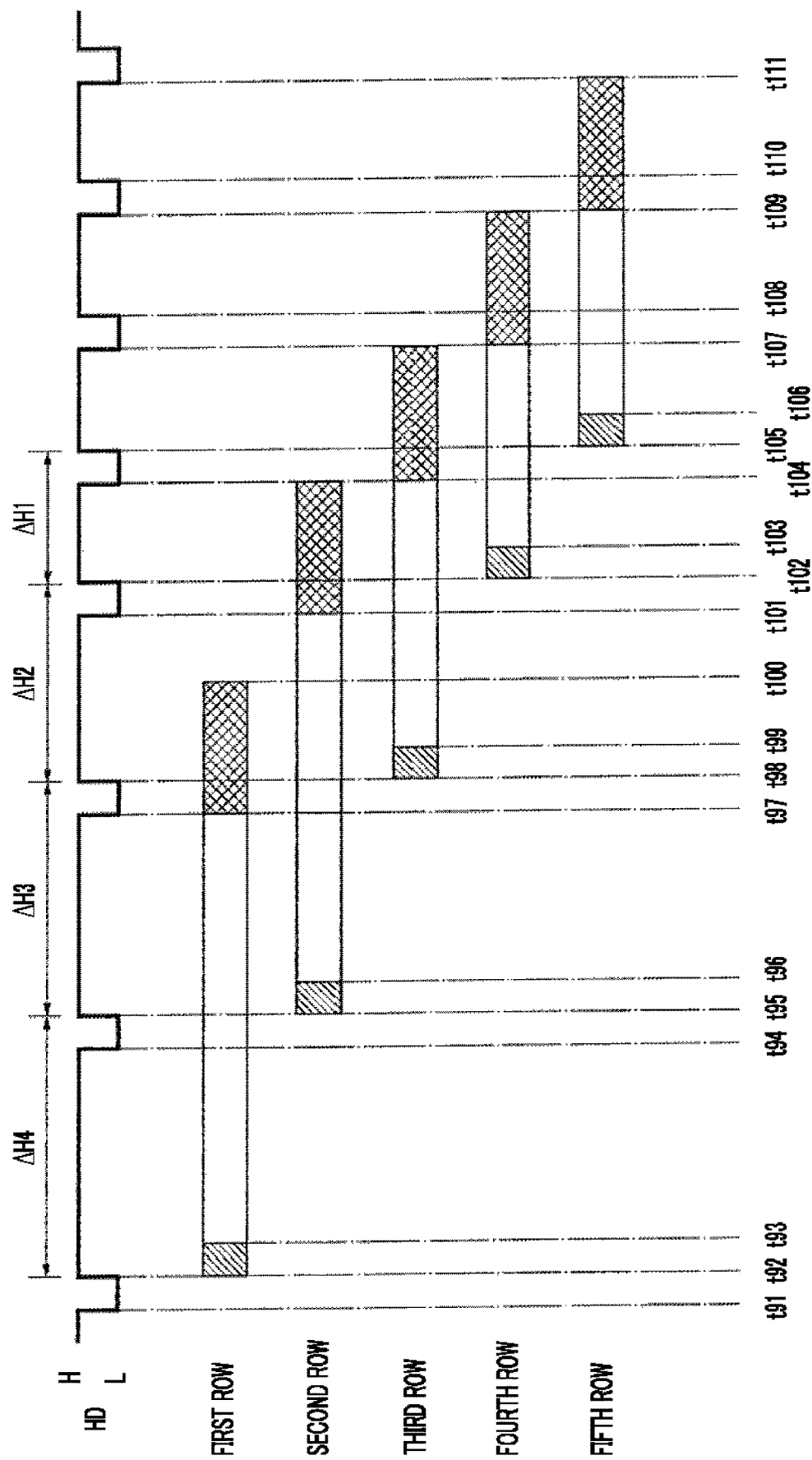
FIG. 6 is a timing chart illustrating a reading process of the imaging device.

FIG. 6 illustrates yet another embodiment and is a timing chart illustrating a reading process of the imaging device 2.

In the timing chart illustrated in FIG. 6, the output interval of the synchronizing signal HD before it is changed is shortened with the delay of output time and the output interval of the synchronizing signal HD after it is changed is shorter than the output interval of the synchronizing signal HD before it is changed. The output interval of the synchronizing signal HD before it is changed may be periodic and the output period may be gradually shortened.

The synchronizing signal HD is at an L level for a period from a time t91 to a time t92, a period from a time t94 to a time t95, a period from a time t97 to a time t98, a period from a time t101 to a time t102, a period from a time t104 to a time t105, a period from a time t107 to a time t108, and a period from a time t109 to a time t110. The synchronizing signal HD is at an H level for a period from the time t92 to the time t94, a period from the time t95 to the time t97, a period from the time t98 to the time t101, a period from the time t102 to the time t104, a period from the time t105 to the time t107, a period from the time t108 to the time t109, and a period from the time t110 to the time t111. After the time t111, the L level and the H level of the synchronizing signal HD are repeated.

The output interval of the synchronizing signal HD is shortened with the delay of the output time until the time t102. After the time t102, the output interval of the synchronizing signal HD is a constant period of ΔH1. At the time t102, the output interval of the synchronizing signal HD is changed.

The pulse output circuit 21 applies the reset pulse to the photoelectric conversion elements 22 in the first row in synchronization with the synchronizing signal HD for the period from the time t92 to the time t93. In a case in which the reset pulse is applied to the photoelectric conversion elements 22 in the first row, the signal charge accumulated in the photoelectric conversion elements 22 in the first row is swept out. At the time t97, the application of the read pulse to the photoelectric conversion elements 22 in the first row starts in synchronization with the synchronizing signal HD. The period from the time t93 when the application of the reset pulse to the photoelectric conversion elements 22 in the first row is stopped to the time t97 when the application of the read pulse starts is the exposure period of the photoelectric conversion elements 22 in the first row. For the exposure period, signal charge is accumulated in the photoelectric conversion elements 22 in the first row.

The pulse output circuit 21 applies the reset pulse to the photoelectric conversion elements 22 in a second row for the period from the time t95 to the time t96. In a case in which the reset pulse is applied to the photoelectric conversion elements 22 in the second row, the signal charge accumulated in the photoelectric conversion elements 22 in the second row is swept out. At the time t101, the application of the read pulse to the photoelectric conversion elements 22 in the second row starts. The period from the time t96 when the application of the reset pulse to the photoelectric conversion elements 22 in the second row is stopped to the time t101 when the application of the read pulse starts is the exposure period of the photoelectric conversion elements 22 in the second row. For the exposure period, signal charge is accumulated in the photoelectric conversion elements 22 in the second row.

Similarly, the reset pulse is applied to the photoelectric conversion elements 22 in a third row for the period from the time t98 to the time t99 and the read pulse is applied to the photoelectric conversion elements 22 in the third row for the period from the time t104 to the time t107. The period from the time t99 to the time t104 is the exposure period of the photoelectric conversion elements 22 in the third row. For the exposure period, signal charge is accumulated in the photoelectric conversion elements 22 in the third row.

The reset pulse is applied to the photoelectric conversion elements 22 in a fourth row for the period from the time t102 to the time t103 and the read pulse is applied to the photoelectric conversion elements 22 in the fourth row for the period from the time t107 to the time t109. The period from the time t103 to the time t107 is the exposure period of the photoelectric conversion elements 22 in the fourth row. For the exposure period, signal charge is accumulated in the photoelectric conversion elements 22 in the fourth row.

The reset pulse is applied to the photoelectric conversion elements 22 in a fifth row for the period from the time t105 to the time t106 and the read pulse is applied to the photoelectric conversion elements 22 in the fifth row for the period from the time t109 to the time t111. The period from the time t106 to the time t109 is the exposure period of the photoelectric conversion elements 22 in the fifth row. For the exposure period, signal charge is accumulated in the photoelectric conversion elements 22 in the fifth row. The reset pulse and the read pulse are applied to the photoelectric conversion elements 22 in the sixth and subsequent rows by the same method as described above.

Until the period of the synchronizing signal HD is changed to a short output interval ΔH1, the output interval of the synchronizing signal HD is gradually shortened in the order of ΔH4, ΔH3, and ΔH2. Therefore, the exposure period of the photoelectric conversion elements 22 in the second row is shorter than the exposure period of the photoelectric conversion elements 22 in the first row and the exposure period of the photoelectric conversion elements 22 in the third row is shorter than the exposure period of the photoelectric conversion elements 22 in the second row. The exposure period is gradually shortened as the number of rows increases. After the output interval of the synchronizing signal HD is changed to the first output interval ΔH1, the period of the synchronizing signal HD is maintained at a constant value.

In the case illustrated in FIG. 6, before the output interval of the synchronizing signal HD is changed at the time t102, the output interval is shortened with the delay of the output time of the synchronizing signal HD. The exposure time of the photoelectric conversion elements 22 becomes shorter as the number of rows becomes larger. This configuration is suitable for an object in which an upper portion is relatively dark, brightness increases gradually toward a lower portion, and the lower portion is relatively bright (in a case in which the photoelectric conversion elements 22 in the former rows are used to indicate the upper portion of the object and the photoelectric conversion elements 22 in the latter rows are used to indicate the lower portion of the object; this configuration is suitable for an object in which an upper portion is relatively bright, brightness is gradually reduced toward a lower portion, and the lower portion is relatively dark in a case in which the photoelectric conversion elements 22 in the former rows are used to indicate the lower portion of the object and the photoelectric conversion elements 22 in the latter rows are used to indicate the upper portion of the object).

In the above-described embodiment, the reset pulse and the read pulse are sequentially applied to the photoelectric conversion elements 22 from the photoelectric conversion elements 22 in the first row in the column direction (the reset pulse and the read pulse are sequentially applied to the photoelectric conversion element 22 in the column direction). However, the reset pulse and the read pulse may be sequentially applied to the photoelectric conversion elements 22 from the photoelectric conversion elements 22 in the last row in the direction opposite to the column direction (the reset pulse and the read pulse are sequentially applied to the photoelectric conversion elements 22 in the direction opposite to the column direction).

In a case in which the imaging device 2 does not apply the reset pulse and the read pulse to the photoelectric conversion elements 22 in the same row, but applies the reset pulse and the read pulse to the photoelectric conversion elements 22 in the same column as described below, the reset pulse and the read pulse are sequentially applied to the photoelectric conversion elements 22 from the photoelectric conversion elements 22 in the first column in the row direction (the reset pulse and the read pulse are sequentially applied to the photoelectric conversion element 22 in the row direction). However, the reset pulse and the read pulse may be sequentially applied to the photoelectric conversion elements 22 from the photoelectric conversion elements 22 in the last column in the direction opposite to the row direction (the reset pulse and the read pulse are sequentially applied to the photoelectric conversion element 22 in the direction opposite to the row direction).

Figure 7:
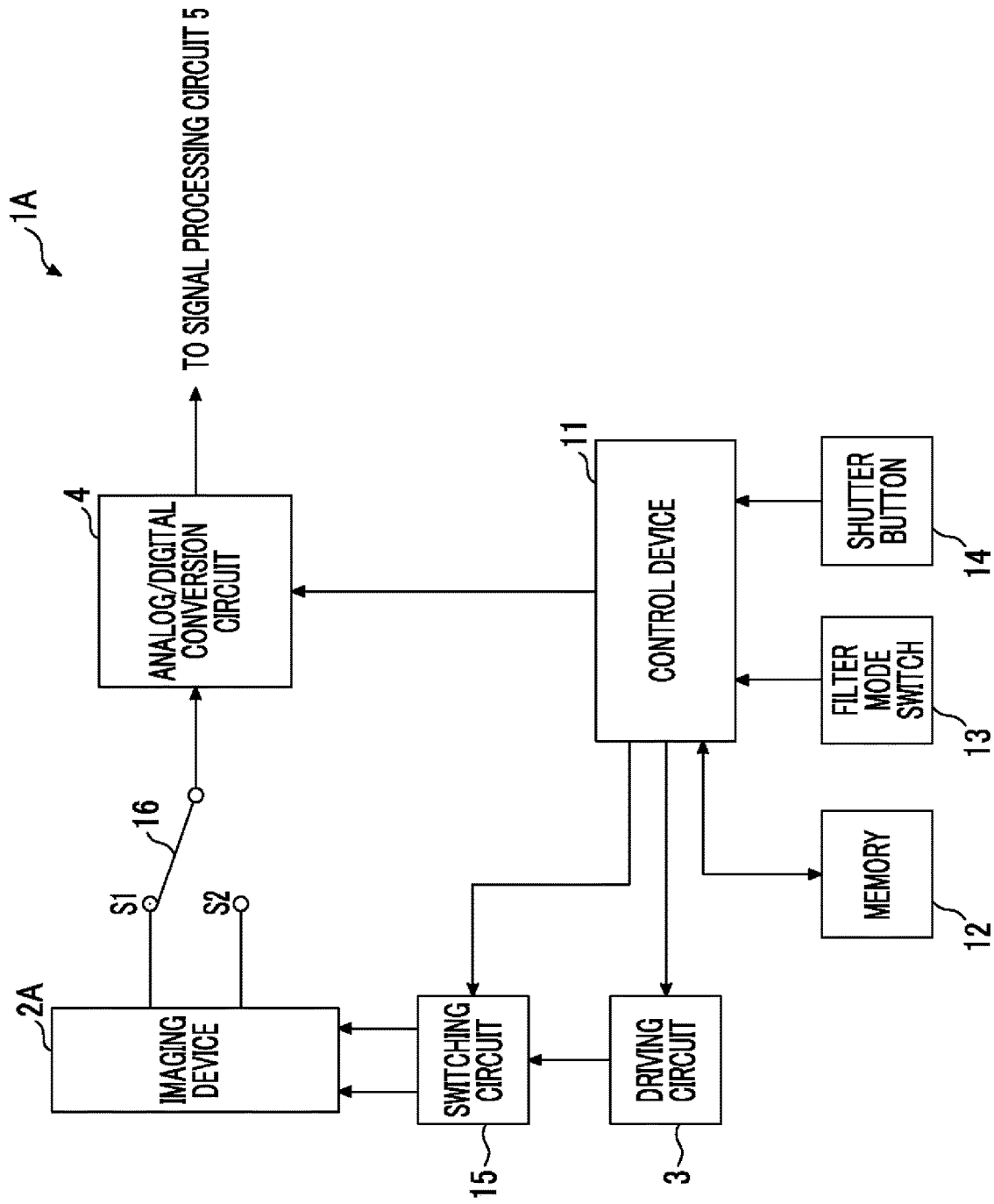
FIG. 7 is a block diagram illustrating a portion of the electric configuration of a digital camera.

FIGS. 7 and 8 illustrate still yet another embodiment.

FIG. 7 is a block diagram illustrating a portion of the electric configuration of a digital camera 1A. FIG. 7 corresponds to the block diagram of the digital camera 1 illustrated in FIG. 1. The same components as those illustrated in FIG. 1 are denoted by the same reference numerals and the description thereof will not be repeated.

FIG. 8 is a block diagram illustrating the electric configuration of an imaging device 2A. FIG. 8 corresponds to the block diagram of the imaging device 2 illustrated in FIG. 2. The same components as those illustrated in FIG. 2 are denoted by the same reference numerals and the description thereof will not be repeated.

As illustrated in FIG. 8, the imaging device 2A is provided with two pulse output circuits 21 and 30. The pulse output circuit 21 has the same configuration as the pulse output circuit 21 illustrated in FIG. 2. A common reset pulse line 25 and a common read pulse line 26 are connected to each row of a plurality of photoelectric conversion elements 22. Reset pulse lines 31 through which a reset pulse is output in synchronization with the synchronizing signal HD and read pulse lines 32 through which a read pulse is output in synchronization with the synchronizing signal HD are connected to the pulse output circuit 30. A common reset pulse line 31 and a common read pulse line 32 are connected to the photoelectric conversion elements 22 in the same column.

In a case in which the pulse output circuit 30 sequentially outputs the reset pulses in the row direction, first, the signal charge accumulated in the photoelectric conversion elements 22 in the first column is swept out. Then, the signal charge accumulated in the photoelectric conversion elements 22 in each column is sequentially swept out. After the reset pulses are output, the read pulses are sequentially output in the row direction from the pulse output circuit 30. The time from the output of the reset pulse to the output of the read pulse is exposure time. In a case in which the pulse output circuit 30 sequentially outputs the read pulses in the row direction, first, the signal charge accumulated in the photoelectric conversion elements 22 in the first column is read from the photoelectric conversion elements 22. Then, the signal charge accumulated in the photoelectric conversion elements 22 in each column is sequentially read to the amplification circuit 23. The amplification circuit 23 converts the signal charge read from the photoelectric conversion elements 22 into an analog signal (voltage). The CDS circuit 34 performs correlated double sampling for the converted analog signal through a horizontal signal line 33 in each column. The analog signal from the CDS circuit 34 is output as an analog video signal from the imaging device 2A through a second output line 35. The analog signal output from the amplification circuit 23 is transmitted to the vertical signal line 24. However, a switch (not illustrated) that switches between the horizontal signal lines 33 may be provided.

The pulse output circuit 21 is a first pulse output circuit that sequentially outputs the reset pulses, which are applied to the photoelectric conversion elements 22 to reset the signal charge accumulated in the photoelectric conversion elements 22, to each row in synchronization with the synchronizing signal HD and sequentially outputs the read pulses, which are applied to the photoelectric conversion elements 22 to read the signal charge accumulated in the photoelectric conversion elements 22, to each row in synchronization with the synchronizing signal HD. The pulse output circuit 30 is a second pulse output circuit that sequentially outputs the reset pulses, which are applied to the photoelectric conversion elements 22 to reset the signal charge accumulated in the photoelectric conversion elements 22, to each column in synchronization with the synchronizing signal HD and sequentially outputs the read pulses, which are applied to the photoelectric conversion elements 22 to read the signal charge accumulated in the photoelectric conversion elements 22, to each column in synchronization with the synchronizing signal HD.

As illustrated in FIG. 7, the synchronizing signal HD output from the driving circuit 3 is transmitted to a switching circuit 15. The switching circuit 15 outputs the synchronizing signal HD to the pulse output circuit 21 or the pulse output circuit 30 included in the imaging device 2A under the control of the control device 11. The driving circuit 3 is a circuit that outputs the synchronizing signal HD to the pulse output circuit 21 (first pulse output circuit) or the pulse output circuit 30 (second pulse output circuit).

In a case in which the synchronizing signal HD is input to the pulse output circuit 21, the signal charge accumulated in the photoelectric conversion elements 22 in each row is read. As described with reference to FIGS. 3 to 6, the output interval of the synchronizing signal HD is changed to change the exposure time of the photoelectric conversion elements 22 in the column direction. For example, in a case in which the digital camera 1A is aligned in the lateral direction (in a case in which the length of an object image obtained by imaging in the lateral direction is larger than that in the longitudinal direction), it is possible to obtain the same object image as that in a case in which an ND filter that changes the amount of exposure in the longitudinal direction (vertical direction) is attached to the digital camera 1A.

In a case in which the synchronizing signal HD is input to the pulse output circuit 30, the signal charge accumulated in the photoelectric conversion elements 22 in each column is read. The output interval of the synchronizing signal HD is changed to change the exposure time of the photoelectric conversion element 22 in the row direction. For example, in a case in which the digital camera 1A is aligned in the longitudinal direction (in a case in which the length of an object image obtained by imaging in the longitudinal direction is larger than that in the lateral direction), it is possible to obtain the same object image as that in a case in which the ND filter that changes the amount of exposure in the longitudinal direction (vertical direction) is attached to the digital camera 1A.

In addition, a switching circuit 21A may be provided in the pulse output circuit 21. The switching circuit 21A (a switching device) switches between the order in which the reset pulse and the read pulse output from the pulse output circuit 21 are sequentially applied in the column direction from the photoelectric conversion elements 22 in the first row and the order in which the reset pulse and the read pulse are sequentially applied in the direction opposite to the column direction from the photoelectric conversion elements 22 in the last row under the control of the control device 11. In a case in which the digital camera 1A is aligned in the lateral direction, the exposure time of an object image obtained by imaging can be adjusted such that it increases gradually from the upper direction or it increases gradually from the lower direction. The switching circuit 21A is switching device for switching the order in which the reset pulse and the read pulse are applied to the photoelectric conversion elements 22 to the row direction or the direction opposite to the row direction. The switching circuit 21A may be provided in the pulse output circuit 21 illustrated in FIG. 2.

Similarly, a switching circuit 30A (a switching device) may be provided in the pulse output circuit 30. The switching circuit 30A switches between the order in which the reset pulse and the read pulse output from the pulse output circuit 21 are sequentially applied in the row direction from the photoelectric conversion elements 22 in the first column and the order in which the reset pulse and the read pulse are sequentially applied in the direction opposite to the row direction from the photoelectric conversion elements 22 in the last column under the control of the control device 11. In a case in which the digital camera 1A is aligned in the lateral direction, the exposure time of an object image obtained by imaging can be adjusted such that it increases gradually from the left direction or it increases gradually from the right direction. The switching circuit 30A is switching device for switching the order in which the reset pulse and the read pulse are applied to the photoelectric conversion elements 22 to the column direction or the direction opposite to the column direction.

Figure 9:
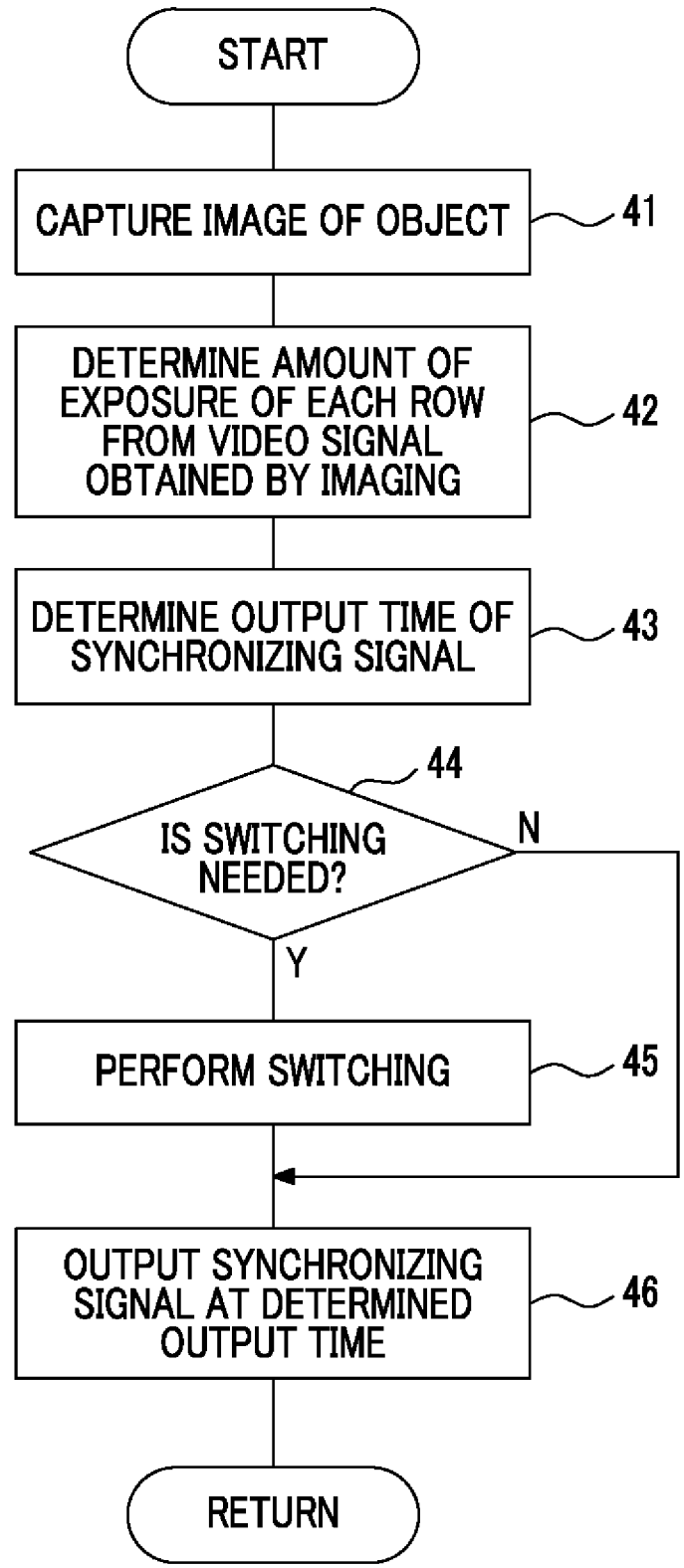
FIG. 9 is a flowchart illustrating the procedure of a reading process of the imaging device.

FIG. 9 is a flowchart illustrating the procedure of an imaging process of the digital camera 1A.

All of the photoelectric conversion elements 22 are set to the same exposure time (all of the photoelectric conversion elements 22 are not necessarily set to the same exposure time) and an image of an object is captured (Step 41). An analog video signal indicating the object image is converted into digital image data and digital brightness data is generated in the signal processing circuit 5. The control device 11 determines the amount of exposure of each row (or each column) in the object image on the basis of the generated digital brightness data (analog video signal) (Step 42). The control device 11 may not determine the amount of exposure of each row, but may divide the object image into blocks, each of which includes a plurality of rows (or a plurality of columns), and may determine the amount of exposure of each portion (block) of the object.

In a case in which the amount of exposure of each row is determined, the control device 11 determines, for example, the exposure time for each row such that the amount of exposure is obtained. The control device 11 determines the output time of the synchronizing signal HD such that the exposure time determined for each row is obtained (Step 43). Then, it is determined whether switching is needed such that the reset pulse and the read pulse are output from the pulse output circuit 21 or the reset pulse and the read pulse are output from the pulse output circuit 30 as described with reference to FIGS. 7 and 8 (Step 44). For example, switching is performed such that the reset pulse and the read pulse are output from the pulse output circuit 21 or the reset pulse and the read pulse are output from the pulse output circuit 30, on the basis of a command input through the touch panel 8. In addition, a command to switch between the switching circuit 21A and the switching circuit 30A is input through the touch panel 8 and it is determined whether switching is needed on the basis of the command (Step 44). In a case in which switching is determined to be needed (YES in Step 44), a switching process is performed (Step 45).

The driving circuit 3 outputs the synchronizing signal HD at the determined output time and the synchronizing signal HD is transmitted to the pulse output circuit 21 or the pulse output circuit 30 (Step 46). The driving circuit 3 outputs the synchronizing signal HD, with which the reset pulse and the read pulse for obtaining the calculated amount of exposure of each portion of the object are synchronized, to the pulse output circuit 21 or 30. As described above, the same object image as that obtained in a case in which the ND filter is attached to the digital camera 1 or 1A is obtained.

What is claimed is:

1. A device for controlling a solid-state electronic imaging device, comprising:
    a solid-state electronic imaging device in which a plurality of photoelectric conversion elements are arranged in a row direction and a column direction and which comprises a pulse output circuit that outputs a reset pulse, which is applied to the photoelectric conversion element to reset signal charge accumulated in the photoelectric conversion element, to each row or each column in synchronization with a synchronizing signal and outputs a read pulse, which is applied to the photoelectric conversion element to read the signal charge accumulated in the photoelectric conversion element, to each row or each column in synchronization with the synchronizing signal; and
    a synchronizing signal output circuit that sequentially outputs the synchronizing signal to the pulse output circuit,
    wherein the output interval of the synchronizing signal before the output interval is changed is constant, and the output interval of the synchronizing signal after the output interval is changed is lengthened with a delay of an output time.

2. The device for controlling a solid-state electronic imaging device according to claim 1,
    wherein the synchronizing signal output circuit changes the output interval of the synchronizing signal with which the reset pulse for resetting the signal charge accumulated in the photoelectric conversion elements after the photoelectric conversion elements in a predetermined row or a predetermined column and the read pulse for reading the signal charge accumulated in the photoelectric conversion elements after the photoelectric conversion elements in a predetermined row or a predetermined column are synchronized.

3. The device for controlling a solid-state electronic imaging device according to claim 1,
    wherein the pulse output circuit comprises:
    a first pulse output circuit that sequentially outputs the reset pulse, which is applied to the photoelectric conversion element to reset the signal charge accumulated in the photoelectric conversion element, to each row in synchronization with the synchronizing signal and sequentially outputs the read pulse, which is applied to the photoelectric conversion element to read the signal charge accumulated in the photoelectric conversion element, to each row in synchronization with the synchronizing signal; and
    a second pulse output circuit that sequentially outputs the reset pulse, which is applied to the photoelectric conversion element to reset the signal charge accumulated in the photoelectric conversion element, to each column in synchronization with the synchronizing signal and sequentially outputs the read pulse, which is applied to the photoelectric conversion element to read the signal charge accumulated in the photoelectric conversion element, to each column in synchronization with the synchronizing signal, and
    the synchronizing signal output circuit outputs the synchronizing signal to the first pulse output circuit or the second pulse output circuit.

4. The device for controlling a solid-state electronic imaging device according to claim 1,
    wherein the solid-state electronic imaging device is a CMOS imaging device.

5. The device for controlling a solid-state electronic imaging device according to claim 1, further comprising:
    an exposure amount calculation device for calculating an amount of exposure of each portion of an object using the signal charge accumulated in the photoelectric conversion elements,
    wherein the synchronizing signal output circuit outputs the synchronizing signal, with which the reset pulse and the read pulse for obtaining the amount of exposure of each portion of the object calculated by the exposure amount calculation device are synchronized, to the pulse output circuit.

6. The device for controlling a solid-state electronic imaging device according to claim 1, further comprising:
a switching device for switching an order in which the reset pulse and the read pulse are applied to the photoelectric conversion elements to the row direction or a direction opposite to the row direction, or to the column direction or a direction opposite to the column direction.

7. A method for controlling a solid-state electronic imaging device in which a plurality of photoelectric conversion elements are arranged in a row direction and a column direction and which comprises a pulse output circuit that outputs a reset pulse, which is applied to the photoelectric conversion element to reset signal charge accumulated in the photoelectric conversion element, to each row or each column in synchronization with a synchronizing signal and outputs a read pulse, which is applied to the photoelectric conversion element to read the signal charge accumulated in the photoelectric conversion element, to each row or each column in synchronization with the synchronizing signal, the method comprising:
allowing a synchronizing signal output circuit to sequentially output the synchronizing signal to the pulse output circuit,
wherein the output interval of the synchronizing signal before the output interval is changed is constant, and the output interval of the synchronizing signal after the output interval is changed is lengthened with a delay of an output time.

\* \* \* \* \*